Jan. 21, 1964     A. W. HUGHES     3,118,174
METHOD FOR ANIMAL IMMOBILIZATION PRELIMINARY TO SLAUGHTERING
Filed Nov. 14, 1960     3 Sheets-Sheet 1
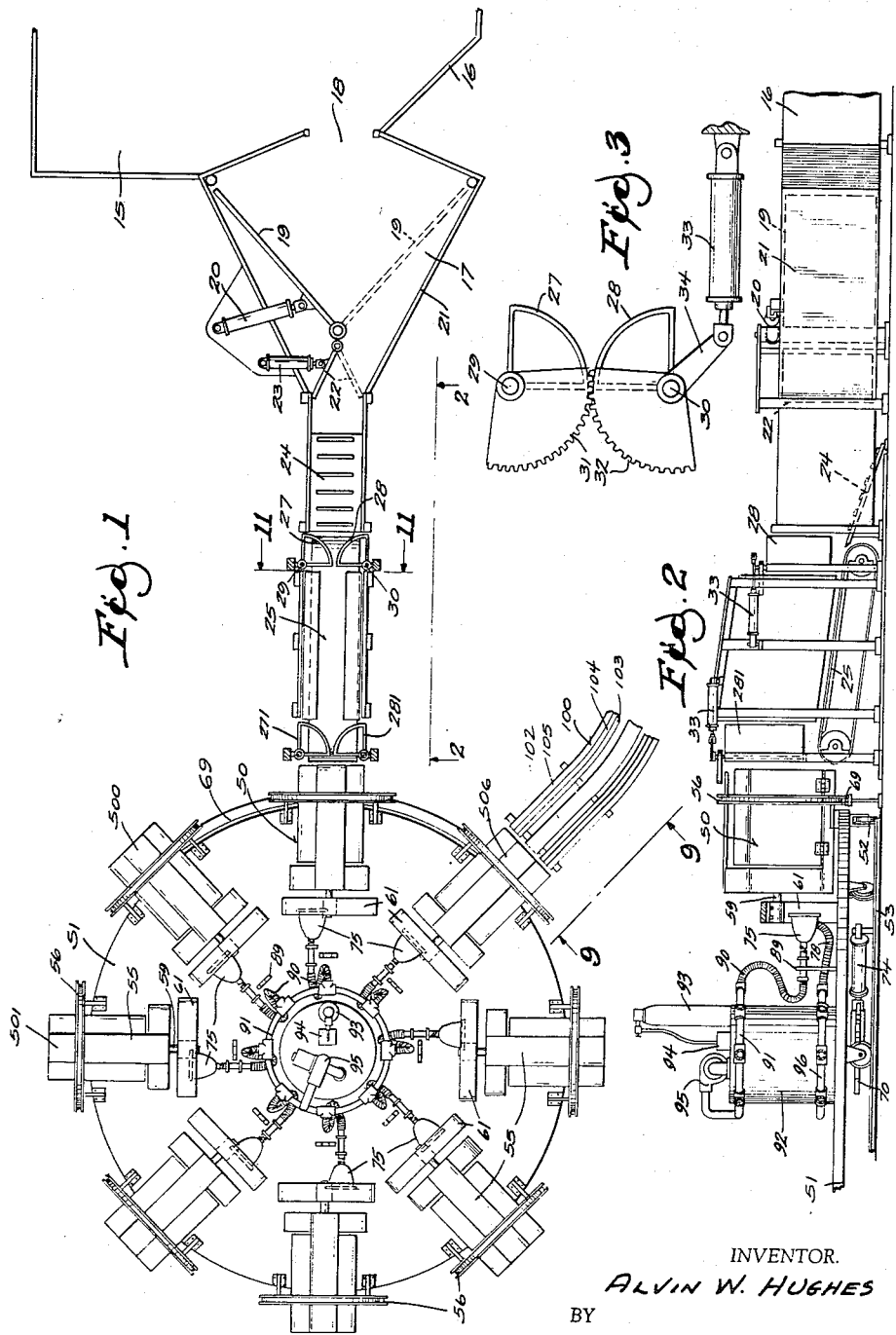
INVENTOR.
ALVIN W. HUGHES
BY
ATTORNEYS

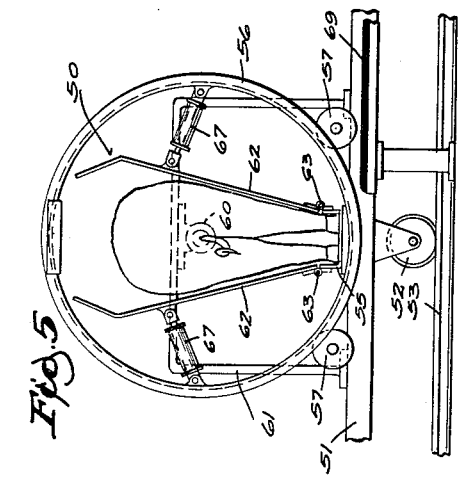
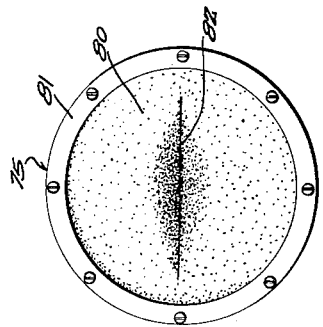
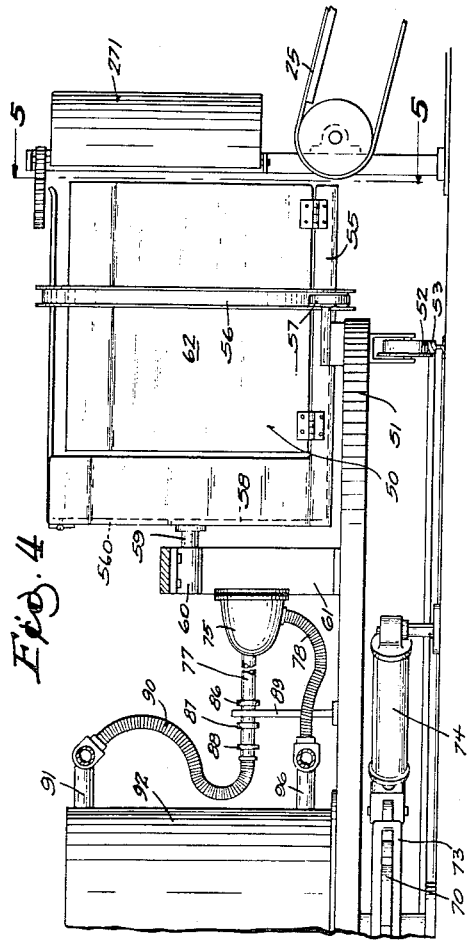
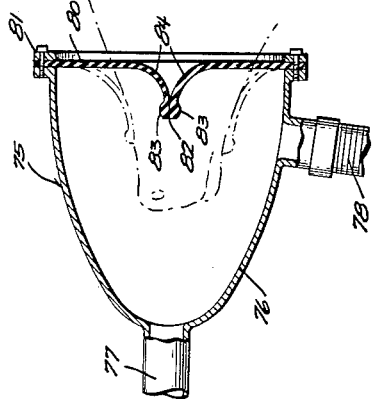
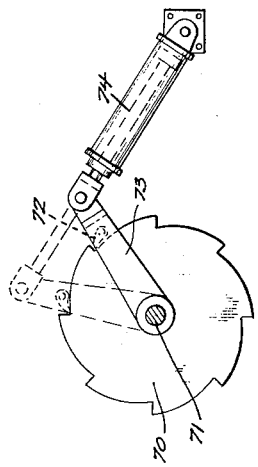
INVENTOR.
ALVIN W. HUGHES

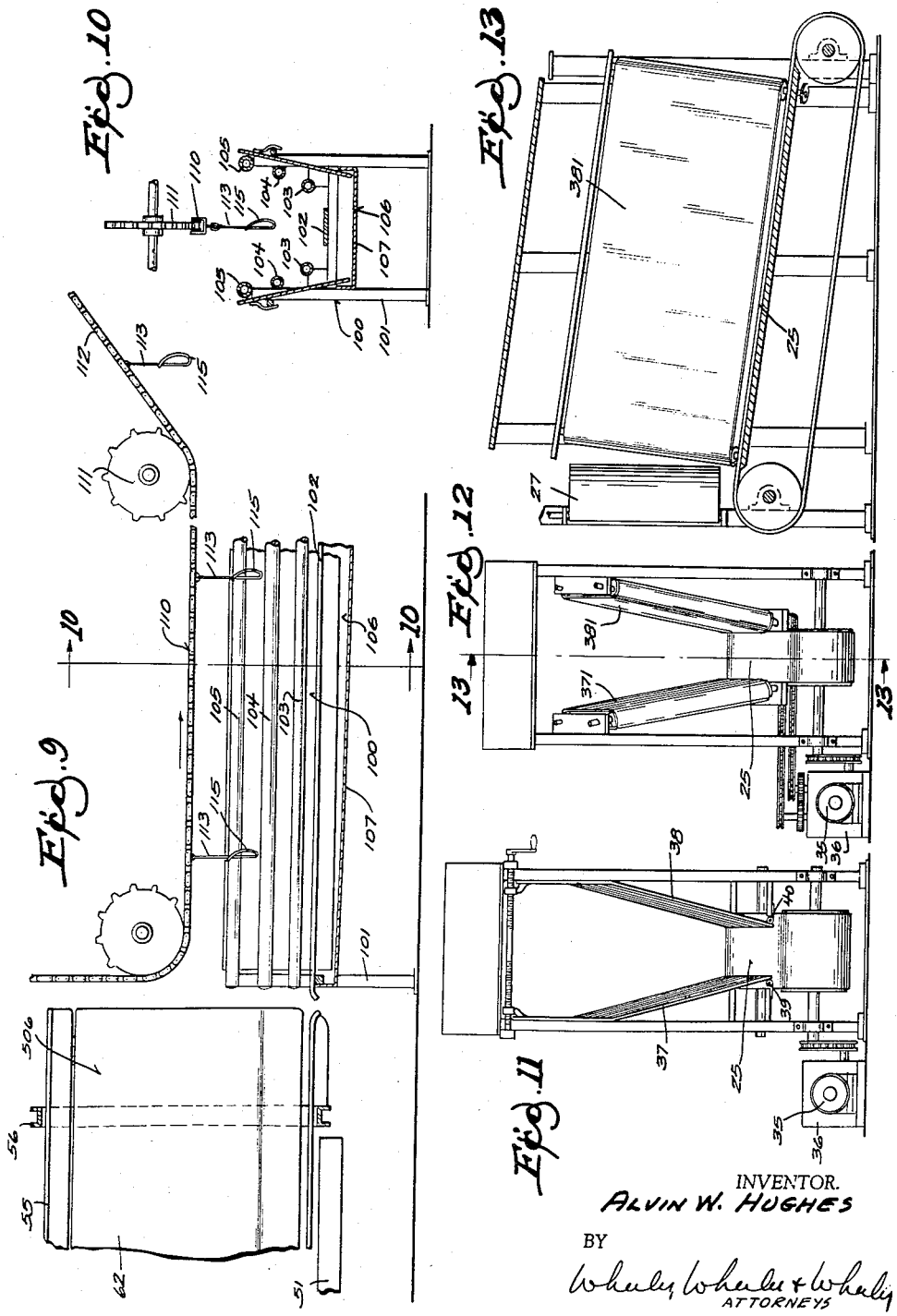

United States Patent Office 3,118,174
Patented Jan. 21, 1964

3,118,174
METHOD FOR ANIMAL IMMOBILIZATION PRELIMINARY TO SLAUGHTERING
Alvin W. Hughes, 4N 194 Church Road, Bensenville, Ill.
Filed Nov. 14, 1960, Ser. No. 69,012
10 Claims. (Cl. 17—45)

This invention relates to a method for animal immobilization preliminary to slaughtering. The present application is a companion to application 839,965, filed September 14, 1959, and contains method claims divided from the identified companion application.

The object of the invention is to prevent damage to the flesh and the organs of the animal to be slaughtered. It is conventional practice to immobilize the animal by electric shock, mechanical slugging or the use of an anesthetic gas. In the conventional practice, the immobilized animal is hoisted, usually by a leg, and then bled. When these conventional practices are followed, the animal is subject to injury at any one of a number of points. Electric shock as a means of immobilizing has the disadvantage that it causes lesions of the lungs and liver which are difficult, if not impossible, to distinguish from lesions caused by disease, thus minimizing the possibility of adequate inspection. All three of the common methods of immobilization are apt to be followed by convulsive twitching. In the case of gassing, the animals thresh about and can injure themselves and each other when first exposed to the gas. In the event that an animal immobilized by gassing is hoisted by a hind leg before being bled, the animal is so completely relaxed that separation of the large leg bone from the hip bone sometimes occurs with resulting rupturing of blood vessels and downgrading and loss of meat.

The present invention contemplates that the animal be restrained or confined individually in such a way as to preclude its threshing about while being immobilized. Since some methods of restraint are themselves of such a character as to occasion damage, the present invention contemplates that the restraint be applied laterally to the opposite sides of the animal in a manner to confine rather than to lift it, and it is further contemplated that the animal immediately be inverted prior to immobilization, since it is found that an animal restrained in an inverted position is not only incapable of threshing about but tends to remain quiescent during and following immobilization. Moreover, the inverted position is ideal for delivery of the immobilized animal onto the bleeding rack with its feet preferably in an upright position and readily accessible for shackling as disclosed in my companion application 861,079, wherein I am claiming the step of bleeding the animal while it is still supported from beneath, and before it is hoisted from the rack.

The preferred structure used in the practice of the method is disclosed in companion application 839,965.

Means subject to the control of an operator includes laterally movable walls and gates and a ramp of which at least a part is motorized, for delivering the animals one at a time into cages mounted on the periphery of a turntable for indexing movement. Each such cage has bearing supports upon which the cage may be inverted. Each cage also is provided with animal-confining means preferably pivoted at or near the animal's feet for adjusting the width of the cage to the width of the animal so that the animal will be confined when the cage turns over.

As the turntable indexes, the cage in which the animal is confined is inverted. This immediately renders the animal completely helpless as the confining means keeps him from threshing about. On the turntable there are immobolizing means for application to the individual animals in their respective cages during turntable rotation. The device is adapted for use with any of the conventional immobilizing procedures such as electrical or mechanical stunning devices or gas. Preferably, gas is applied individually through masks connected with a source of immobilizing gas and applicable by an attendant to the individual animals inverted in the respective cages. Thus, during successive indexing movements of the turntable, the animals are being immobilized in a gas which is supplied to their respective masks. Before the turntable has completed one rotation, the animals are unconscious.

It is extremely important that the animal be bled prior to being lifted, as an animal lifted while its veins still contain blood may rupture blood vessels in the leg that is shackled, thus reducing the value of the resulting meat. Therefore, in accordance with the present invention, a shackle dangling from an overhead conveyor is attached to the animal's hoof while he still lies immobile in the inverted cage with its legs extended upwardly and therefore readily accessible for shackling. As the shackle draws the animal outwardly over a bleeding rack, the animal is stuck and bled so that by the time the conveyor lifts the animal from the rack, the animal no longer has sufficient blood in its veins to do any damage.

Details of the foregoing structure and incidental apparatus will be described specifically with reference to the attached drawings.

In the drawings:

FIG. 1 is a plan view of apparatus embodying the invention, some parts being omitted for the sake of clarity.

FIG. 2 is a fragmentary detail view partially in side elevation and partially in section on the line 2—2 of FIG. 1.

FIG. 3 is an enlarged detail view in plan of a set of animal control gates and means for the operation thereof.

FIG. 4 is an enlarged detail view in side elevation similar to a portion of FIG. 2 but on a larger scale, portions of the apparatus being broken away.

FIG. 5 is a view of one of the invertible cages on the turntable as it appears in end elevation in the plane indicated at 5—5 in FIG. 4.

FIG. 6 is an enlarged detail view of the indexing ratchet of the turntable.

FIG. 7 is an enlarged detail view of the immobilizing mask as it appears in longitudinal section.

FIG. 8 is an end elevation of the mask shown in FIG. 7.

FIG. 9 is a fragmentary detail view of a portion of the invertible cage and bleeding rack and shackle conveyor as viewed from the standpoint indicated at 9—9 in FIG. 1.

FIG. 10 is a view of the bleeding rack in cross section on the line 10—10 of FIG. 9.

FIG. 11 is a detail view of the motorized portion of the loading rack shown on an enlarged scale as it appears in section on the line 11—11 of FIG. 1.

FIG. 12 is a view similar to FIG. 11 showing a modified loading ramp structure.

FIG. 13 is a view taken in section on the line 13—13 of FIG. 12.

The animals enter the apparatus from a pen 15 of which a portion of the wall is shown at 16 in FIG. 1. They are advanced subject to the control of metering apparatus which includes a smaller pen 17 communicating with pen 15 through an opening at 18 and having a movable partition 19 pivoted to sweep across said opening from the full line position of FIG. 1 to the dotted line position shown therein subject to the control of a ram 20.

As the partition 19 approaches the wall 21 of the metering pen 17, the animal is confined and can progress only forwardly through the pivoted gate 22. This gate is normally retracted in the position which is shown in full lines and may be advanced by ram 23 to a dotted line position behind the animal to prevent him from backing away from the ramp leading to the immobilizing cages on the conveyor hereinafter to be described.

The ramp includes a relatively fixed ramp portion 24 and a motorized ramp portion 25, the latter being in the nature of a treadmill but operated to advance the animals forwardly. An animal can stand motionless upon ramp portion 24 pending disposition of an animal which is already being propelled upwardly on ramp portion 25. Between these two ramp portions, there are gates 27, 28 which are oscillatory upon rock shafts 29 and 30, and connected for concurrent operation. In the particular arrangement shown, gear segments 31 and 32 on rock shafts 29 and 30 provide the desired connection. Operation of the illustrated device is by means of a ram 33 acting on one of the rock shafts through a rocker arm 34. Gates 27 and 28 present arcuate surfaces of substantial uniform radius to the animal which may be standing on the stationary ramp portion 24 so that the opening of the gate does not frighten the animal or tend to push it rearwardly on such ramp portion.

When the motorized ramp portion 25 is free, the gates 27 and 28 will be opened by swinging them out in front of the animal and the animal will be caused by prods or otherwise to advance onto the movable ramp portion 25 which comprises a conveyor which may be driven from motor 35 (FIG. 11) through a gear reducer 36. The animal is laterally confined by side walls 37 and 38 which are desirably hinged at their bottom margins as shown at 39 and 40 in FIG. 11, whereby they may be adjusted to confine the legs as well as the bodies of animals of different sizes without so lifting the animal that its legs are free. FIGS. 12 and 13 show a motorized ramp portion which is identical so far as the conveyor apron 25 is concerned but has, in conjunction with the motorized supporting belt, side walls 371 and 381 which likewise comprise motorized aprons so that the animal will be positively propelled forwardly both by the belt 25 on which his feet are supported and by the sides 371 and 381 which may engage his flanks.

At the forward end of the motorized ramp section 25, there is desirably another set of the pivoted gates 271, 281 identical with gates 27, 28 as already described. These are opened as the animal is advanced by the motorized ramp 25 and closed after the animal passes through them and enters the cage generically designated by reference character 50.

As shown, there are eight of the cages 50 mounted on a turntable 51. The turntable may conveniently be supported by wheels 52 from a track 53 as shown in FIGS. 2, 4 and 5.

Each cage comprises a channel-shaped bottom 55 mounted within a ring 56 which supports the weight of the cage upon rollers 57 on the turntable. By rotating the cage upon the bearings provided by the ring 56 and rollers 57, each cage individually may be inverted. To steady the cage in its inverting rotation, there is a stud 59 on the cage front wall 55 which projects into a bearing 60 mounted on stand 61 on the turntable. With the cage right-side-up the front opening which is then above the stud 59 is closed by a hinged frame wall portion 560 which may later be opened in the inverted position of the cage to permit the animal to be immobilized.

The cage sides include relatively movable side wall portions 62 (FIG. 5), these being hinged at 63 to the flange of the bottom channel 55. The channel is wide enough for the animal's feet. The sides diverge upwardly at an included angle which may be varied by oscillating the respective side walls 62 upon their hinges 63 through the medium of rams 67. The sides will ordinarily be retracted sufficiently so that the animal will move freely into the cage. When the animal is in the cage and the gates 271, 281 are closed behind him, the rams 67 will be charged with fluid pressure to pivot the side wall 62 of the cage into engagement with the sides of the animal, thereby closely confining the animal against movement in any direction.

The cage is readily rotatable by hand when unloaded. When it contains an animal, it is, of course, fairly heavy. To assist in the inversion of the cage and the animal contained therein, a stationary rubber-covered rail is desirably provided at 69 in a position to be engaged by the cage ring 56 as soon as each cage 50 leaves the loading station in which it registers with the power-operated ramp 25 and the gates 271, 281. Thus, as the turntable is indexed, the initial movement will engage the cage ring 56 with rail 69 and the rotation of the ring on the rail will invert the cage and the animal. The cages shown at 500 and 501 (and all of the other cages except at the loading station) are shown in their inverted positions.

Turntable indexing movement may be supplied in any desired manner but it is convenient to use a ratchet 70 mounted on the turntable shaft 71 and actuated by a pawl 72 carried by lever 73 which is pivoted on shaft 71 and driven by ram 74 under the control of the operator (see FIGS. 2, 4 and 6). As soon as possible after the animal is confined in the cage by engagement between the pivoted sides 62 thereof (certainly as soon as the indexing movement of the cage on turntable 51 has progresssed to the point where the animal is helpless) the animal will be immobilized by any desired method. The head of the animal is readily accessible for electrical or mechanical stunning but it is preferred, for the purposes of this disclosure, to immobilize the animal by applying over the animal's mouth and nose a mask such as that shown at 75 in FIGS. 7 and 8. This mask comprises a shell 76 having a gas inlet pipe 77 which serves as a handle for the manipulation of the mask. The mask desirably has a gas circulating return pipe 78.

At the front of the shell 76, a slit diaphragm 80 is fixed by a ring 81. The diaphragm has a transverse slit at 82 with beaded margins 83 toward which the diaphragm converges inwardly at 84 as best shown in FIG. 7. When the mask is forced partially onto the snout of an animal as shown in dotted lines in FIG. 7, the slit receives the animal's snout, the beaded margins being separated as shown in dotted lines, the fit around the animal's snout is sufficiently close to require the animal to breathe air saturated with the immobilizing gas to any desired extent.

To keep the mask from falling away from the animal's snout, its gas inlet 77 desirably has the form of a rigid pipe serving as a handle for manipulation of the mask and flanged at 86, 87, 88 for engagement with the forked upper end of a standard 89 as shown in FIG. 1 and FIG. 4. The selective positioning of the pipe 77 with respect to the standard will hold the mask to the animal's head in any position at which the respective flange 86, 87 or 88 is engaged with the standard 89. A flexible hose 90 connects the end of pipe 77 with a manifold 91 that encircles the gas mixture tank 92.

The gas cylinder 93 opens into the tank 92 through an equalizer valve 94 which maintains the mixture approximately constant but which forms no part of the present invention. A blower 95 delivers the mixture from the tank 92 into the manifold 91 which supplies the various masks. The flexible return hoses 78 from the several masks lead into a manifold 96 whereby the mixture is recirculated into the tank 92. The slight pressure provided by the blower 95 assures that any leakage through the diaphragm which confines the animal's head will tend to be outward rather than inward. At the same time, there is not a great deal of pressure within the mask because of the recirculation provided by the hoses 78 which return the gas to the tank at the suction side of the blower.

It is not necessary to use a gas which anesthetizes the nerve centers of the animal. In preferred practice, the gas used is carbon dioxide, nitrogen or argon or other non-toxic inert gas and it operates to immobilize the animal simply by depriving him of adequate oxygen for the maintenance of consciousness.

The weight of the animal in the inverted cage will tend to maintain the cage inverted. When the animal is withdrawn, following immobilization, the cage will tend to return by gravity to its original erect position.

The immobilized animals may, for some purposes, be unloaded at any station in the course of advance of their respective cages with the turntable. In preferred practice of the invention, the unloading station is immediately adjacent the loading station. The unloading station is that at which FIG. 1 shows a cage 506. Extending outwardly from the unloading station is the bleeding rack 100 as best shown in FIGS. 1, 9, 10. This rack comprises a frame 101 with a supporting strip 102 on which the weight of the immobilized animal is carried. At suitable spacing along the sides are tubular bars 103, 104, 105 between which the body of the animal is confined. Beneath the rack is a blood-collecting trough 106 which is preferably inclined or has a pitched bottom 107.

Extending longitudinally along the rack overhead is a shackle conveyor run 110. Only a portion of the endless conveyor is illustrated. In passing over a sprocket 111 remote from the turntable, the conveyor has a run extending upwardly as shown at 112 in FIG. 9.

Depending at intervals from the conveyor are the thongs 113 with shackles 115 at their ends. An attendant will engage such a shackle with the hoof of an immobilized animal as the latter lies within the cage at the unloading point. The side wall portions 62 of the cage being retracted by the relief of pressure in the ram cylinders 67, the animal will be released so that the continued movement of the conveyor will cause the shackle to pull the animal along the rack. Immediately the animal will be "stuck" by opening a blood vessel in its throat.

As the animal slides along the rack, its blood will flow into the trough 106 and be delivered to a suitable point of collection. Meantime, by the time the conveyor run 112 lifts the shackle and the animal to which it is attached, the animal will no longer have the strength to resist and therefore the meat will not be damaged.

This application is a companion to my application Serial No. 536,389 now Patent No. 2,978,737, issued April 11, 1961, wherein the use of such a bleeding rack and the method of immobilizing and bleeding as above described has been disclosed. An important feature is to carry the weight of the animal along the rack until the bleeding has progressed sufficiently far so that no damage will result when the animal is lifted. The animal is supported from below, with or without movement along the rack, until the bleeding has rendered it incapable of effective resistance and the animal is then lifted and suspended from above for the completion of bleeding.

The disclosed method includes a lateral confinement of the individual animal preliminary to the immobilization of such animal and it is preferred that inversion of the animal to a position on its back will occur after lateral confinement and prior to immobilization. In the preferred practice of the invention, using gas as a means of immobilization, the method includes the application of a mask to each individual animal, a supply of the immobilizing gas to the mask preferably being recirculated therethrough. This eliminates the tunnel and pit treatments heretofore proposed and makes much more efficient use of the gas. It is also much more humane. The time required for the animal to lose consciousness is very much less than is required in tunnel and pit treatments and the animal in its inverted position seems to accept the situation more readily and does not and cannot thresh about with possible injury to the flesh or to other animals. A single operator stationed on the turntable can do the immobilizing. The only other operators required are the operator who controls the admission gates and turntable movement and the operator who does the shackling and sticking.

While the invention has been described with particular reference to animal slaughtering, those skilled in the art will recognize that animals may be handled in the appropriate portion of this apparatus for other purposes, including treatment by a veterinarian, the lateral confinement of the animal and inversion of his cage being sufficeint, without more, to protect both the animal and the veterinarian. Similarly, for other purposes, it may be desired to administer gas to an animal without the inversion step and for purposes other than slaughtering. The mask, particularly as used with the means for preventing displacement thereof by locking the mask and animal against separation, is a convenient device for these purposes.

I claim:

1. A method of animal slaughtering which comprises subjecting the animal to opposite lateral pressures, inverting the animal, immobilizing the inverted animal by depriving it of consciousness while the animal is still alive, and bleeding the immobilized animal.

2. The method of claim 1 in which the step of immobilizing includes administering gas.

3. The method of claim 1 in which the step of immobilizing includes electric stunning.

4. The method of claim 1 in which the step of immobilizing includes mechanical stunning.

5. A method of slaughtering which includes the steps of administering an immobilizing gas to an animal, sticking the immobilized animal, supporting the animal from below until it has bled sufficiently to be incapable of effective resistance and thereafter suspending the animal head down, the animal being inverted prior to the administration of such gas, the gas being administered while the weight of the animal is not carried on its own feet.

6. The method recited in claim 5 in which the animal is in substantially continuous motion in a generally rearward and horizontal direction while supported from below and while bleeding is progressing, such motion continuing in an upward direction to suspend the animal.

7. A method of slaughtering an animal which includes the steps of inverting the animal, immobilizing the inverted animal by depriving it of consciousness while the animal still lives, bleeding the immobilized animal by sticking it, and supporting the animal from below until it has bled sufficiently to be incapable of elective resistance.

8. The method of claim 7 in which the step of immobilizing the animal is carried out by anesthetizing the animal with gas.

9. The method of claim 7 in which the step of immobilizing the animal is carried out by the step of electrically stunning the animal.

10. A method of slaughtering an animal, which method includes the steps of relieving the animal's feet of the weight of the animal by inverting the animal, immobilizing the animal, thereafter sticking the immobilized animal to initiate bleeding, supporting the animal from below until it has bled sufficiently to be incapable of effective resistance, and thereafter suspending the animal.

References Cited in the file of this patent

UNITED STATES PATENTS

| 1,599,134 | King | Sept. 7, 1926 |
| 1,980,679 | Graham | Nov. 13, 1934 |
| 2,733,477 | Murphy | Feb. 7, 1956 |
| 2,895,164 | Murphy | July 21, 1959 |